(12) United States Patent
Geissler

(10) Patent No.: US 11,565,663 B2
(45) Date of Patent: Jan. 31, 2023

(54) WIPER BLADE, IN PARTICULAR FOR A MOTOR VEHICLE

(71) Applicant: Robert Bosch GmbH, Stuttgart (DE)

(72) Inventor: Sascha Geissler, Lichtenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/211,461

(22) Filed: Mar. 24, 2021

(65) Prior Publication Data

US 2021/0300301 A1 Sep. 30, 2021

(30) Foreign Application Priority Data

Mar. 26, 2020 (DE) ...................... 10 2020 203 912.7

(51) Int. Cl.
*B60S 1/52* (2006.01)
*B60S 1/34* (2006.01)
*B60S 1/38* (2006.01)

(52) U.S. Cl.
CPC ............. *B60S 1/524* (2013.01); *B60S 1/3415* (2013.01); *B60S 1/381* (2013.01); *B60S 1/3862* (2013.01)

(58) Field of Classification Search
CPC ...... B60S 1/381; B60S 1/3862; B60S 1/3415; B60S 1/522; B60S 1/524
USPC ..................................................... 15/250.04
See application file for complete search history.

(56) References Cited

U.S. PATENT DOCUMENTS

| | | | | |
|---|---|---|---|---|
| 2,168,202 A | * | 8/1939 | Grantham | B60S 1/48 15/250.04 |
| 2,432,690 A | * | 12/1947 | Smulski | B60S 1/4064 15/250.04 |
| 2,582,717 A | * | 1/1952 | Pierce | B60S 1/48 15/250.04 |
| 2,648,865 A | * | 8/1953 | Gordon | B60S 1/524 15/250.04 |
| 3,591,887 A | * | 7/1971 | Keddie | B60S 1/48 15/250.02 |
| 4,893,374 A | * | 1/1990 | Bienert | B60S 1/34 15/250.04 |
| 2008/0263806 A1 | * | 10/2008 | Egner-Walter | B60S 1/524 15/250.01 |

FOREIGN PATENT DOCUMENTS

| | | | |
|---|---|---|---|
| DE | 10000373 | * | 8/2001 |
| DE | 102007062304 | * | 6/2009 |
| WO | 2019/120670 | * | 6/2019 |

OTHER PUBLICATIONS

Machine translation of description portion of German publication 102007062304, published Jun. 2009. (Year: 2009).*
Machine translation of description portion of German publication 10000373, published Aug. 2001. (Year: 2001).*
Machine translation of description portion of WO publication 2019/120670, published Jun. 2019. (Year: 2019).*

* cited by examiner

*Primary Examiner* — Gary K. Graham

(74) *Attorney, Agent, or Firm* — Michael Best & Friedrich LLP

(57) ABSTRACT

A wiper blade (10), in particular for a motor vehicle, is proposed. It comprises a wiper bar (12) and a coupling element (14) which comprises a coupling connection piece (26) for coupling a fluid channel (22). The coupling connection piece (22) is constructed to be at least partially flexible.

7 Claims, 3 Drawing Sheets

WIPER BLADE, IN PARTICULAR FOR A MOTOR VEHICLE

BACKGROUND

The invention relates to a wiper blade.

Numerous wiper blades which have a wiper bar and a coupling element which comprises a coupling connection piece for coupling a fluid line are already known. The fluid is in this instance first guided by the wiper arm into the coupling element to outlet nozzles. To this end, there is arranged on the coupling element the coupling connection piece to which a fluid line which guides the fluid into the coupling element or out of the coupling element is connected.

SUMMARY

The wiper blade according to the invention having the features of the main claim has the advantage that the coupling connection piece is constructed to be at least partially flexible. A secure connection between the coupling element and the fluid line is thereby produced.

As a result of the measures set out in the dependent claims, further advantageous developments and improvements of the features which are set out in the main claim are produced.

In a simple and therefore advantageous embodiment, the coupling element is provided for coupling the fluid line to the wiper bar.

It is particularly advantageous for the coupling connection piece of the coupling element to be connected to the wiper bar so that a reliable fluid transport is ensured.

It may further be considered to be advantageous for the coupling element to be provided for securing to a wiper arm since the coupling element, in addition to fluid transport, also takes up the securing function for the wiper blade.

In a cost-effective and therefore advantageous embodiment, the wiper bar has a wind deflector strip which carries the fluid line or which is constructed integrally therewith.

It may further be considered to be advantageous for a plurality of coupling connection pieces to be provided since, in this manner, optimum water guiding or cleaning agent guiding is enabled.

It is particularly advantageous in this instance for at least one of the coupling connection pieces to be provided for guiding fluid into the fluid line since optimum water guiding or cleaning agent guiding is thus enabled.

In a simple and therefore advantageous embodiment, the coupling connection piece is constructed as a ball seat connection piece. This enables a high level of flexibility and adaptability. In this instance, it may be advantageous for the coupling connection piece to be guided laterally so that a two-dimensional flexibility is produced.

It is particularly advantageous for the coupling connection piece to have a ribbing or an undercut since in this manner the fluid line can be secured in a stable manner to the coupling connection piece.

In a simple, cost-effective and therefore advantageous embodiment, at least one coupling connection piece is constructed as a two-way or four-way connection piece.

BRIEF DESCRIPTION OF THE DRAWINGS

An embodiment of the invention is illustrated in the drawings and explained in greater detail in the following description. In the drawings.

DETAILED DESCRIPTION

Figure 1:
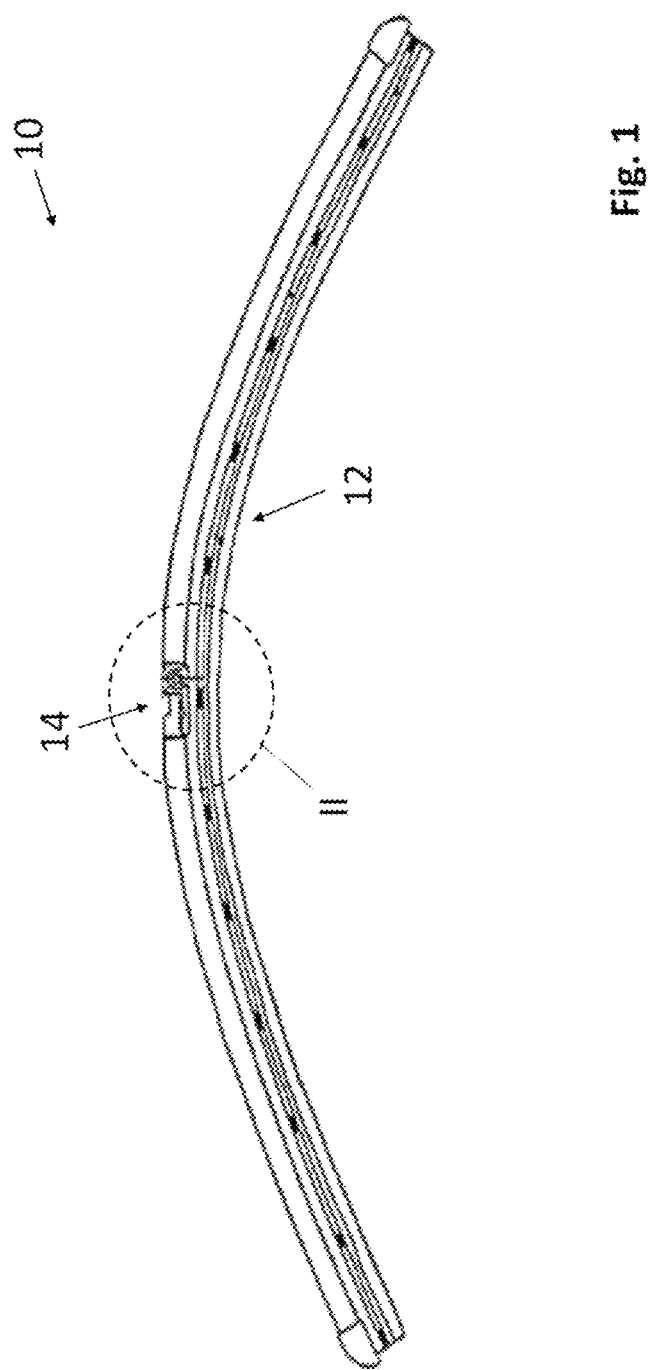
FIG. 1 is a schematic side view of a wiper blade according to the invention.

FIG. 1 is a schematic side view of a wiper blade 10 according to the invention. It comprises a wiper bar 12 and a coupling element 14 for securing to a wiper arm which is not shown here for reasons of clarity. The wiper blade 10 according to the invention is constructed in this instance as a wet blade in which cleaning fluid can be guided in the wiper bar 12 and during a wiping operation can be applied directly from the wiper bar 12 to the window.

Figure 2:
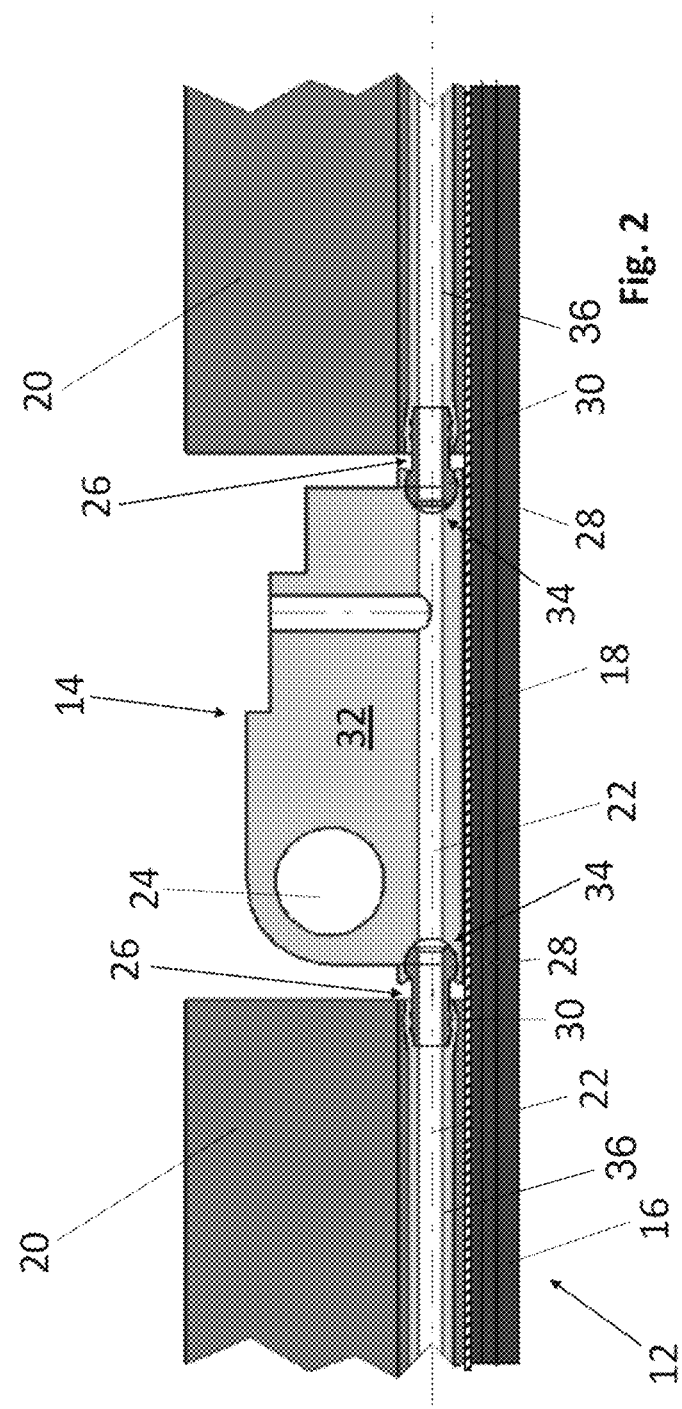
FIG. 2 is a schematic side view of the region of the coupling element of a wiper blade according to the invention.

In FIG. 2, the region of the coupling element 14 of the wiper blade 10 (FIG. 1) shown in FIG. 1 is shown as a schematic side view. The wiper bar 12 (FIG. 1) is formed by means of a wiper strip 16 and a resilient rail 18. The wiper strip 16 is positioned during operation on a window of a motor vehicle and the resilient rail 18 which is provided with pretensioning ensures a constant support of the wiper strip 16 on the window. To this end, the wiper strip 16 is secured to the resilient rail 18.

Furthermore, there is secured to the resilient rail 18 a wind deflector strip 20 which increases the contact force with which the wiper strip 16 is pressed against the window during operation. Within the wind deflector strip 20 there is provided a fluid channel 22, through which a cleaning fluid, for example, water, can be transported along the wiper bar 12. This fluid channel 22 may, for example, have openings in order to apply the cleaning fluid to the window in the region of the wiper strip 16. The fluid channel 22 can also lead at the ends of the longitudinal extent or along the longitudinal extent of the wiper blade 10 (FIG. 10) to nozzles, via which the fluid can be applied to the window.

The coupling element 14 is also secured to the resilient rail 18. The coupling element 14 has securing means 24, by means of which the coupling element 24 can be mechanically secured to a wiper arm. The securing means 24 is in this instance constructed as an opening, through which a bolt which is provided on the wiper arm can be introduced.

In the coupling element 14, the fluid channel 22 of the wiper bar 12 is further continued. For connection, the coupling element 14 has a coupling connection piece 26 which is constructed as a ball seat connection piece. The coupling connection piece 26 therefore has a spherical portion 28 and a tubular portion 30 and is constructed at the inner side thereof to be hollow in order to continue the fluid channel 22. In order to secure the coupling connection piece 26, a base portion 32 of the coupling element 14 has in the region of the fluid channel 22 a hollow spherical region 34 in which the spherical portion 28 of the coupling connection piece 26 is inserted so that a ball joint is formed. The arrangement of the hollow spherical region 34 is in this instance such that the spherical portion 28 is supported in a rotationally movable manner in the hollow spherical region 34 in such a manner that the liquid channel 22 of the coupling element 14 is continued via the spherical portion 28 and the tubular portion 30 of the coupling connection piece 26 into the wiper bar 12. Consequently, the coupling connection piece 26 is constructed to be movable, that is to say, flexible.

In order to continue the fluid channel 22 via the coupling connection piece 26, there is pulled via the tubular portion 30 of the coupling connection piece 26 a resilient hose 36 which in a variation of the invention may also be constructed integrally with the wind deflector strip 20.

The fluid channel 22 is further continued in the direction of the wiper arm. The supply of the fluid into the fluid channel 22 is carried out in this instance on the coupling element 14 which is connected to a supply line which is arranged on the wiper arm. In this instance, a hollow spherical region 34 may also be provided so that the coupling connection piece 26 is flexible.

Figure 3:
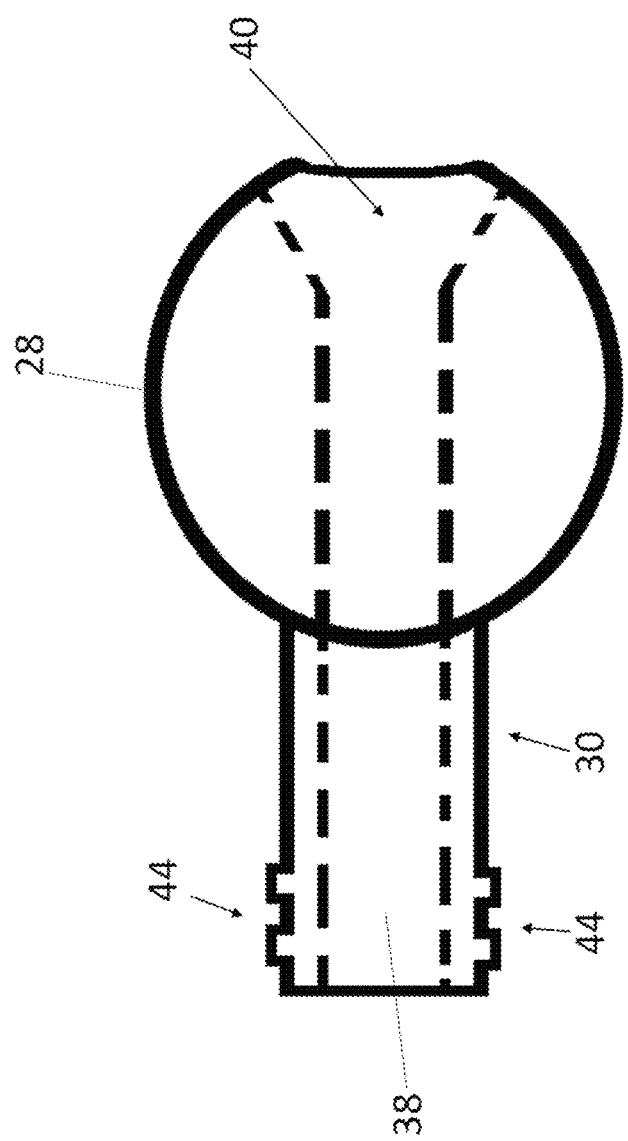
FIG. 3 shows a coupling connection piece of a coupling element in detail.

In FIG. 3, the coupling connection piece 26 is shown as a schematic side view. This connection piece is constructed substantially in two pieces and therefore comprises the spherical portion 28 and the tubular portion 30. The spherical portion 28 and the tubular portion 30 are securely connected to each other or constructed in an integral manner. The tubular portion 30 is hollow at the inner side so that there is formed a channel 38 which continues into the spherical portion 28. At the end of the longitudinal extent of the channel 38, it has at the side of the spherical portion 28 a conical expansion 40 which extends outwardly. At the other side of the longitudinal extent of the tubular portion 30, a ribbing 44 is provided and comprises one or more peripheral thickened portions of the tubular portion 30. The ribbing 44 ensures secure retention of the resilient hose 36. The fluid channel 22 is therefore formed by the interior of the hose 36, the channel 38 and the interior of the base portion 32 of the coupling element 14.

The expansion 40 serves to ensure that, in the event of a twisting of the coupling connection piece 26 in the hollow spherical region 34, the throughflow of fluid is carried out in a substantially undisrupted or non-reduced manner. The coupling connection piece 26 is produced in an integral manner from plastics material. In a variation of the invention, however, a construction from metal, in particular a rust-resistant metal, such as aluminum, is also possible.

The base portion 32 of the coupling element 14 is constructed in this instance as a plastics material injection-molded component and secured to the resilient rail 18. In a variation, the base portion 32 may also be secured to a separate securing element which is secured to the resilient rail 18, in particular in a rotationally movable manner. In a variation of the invention, the base portion 32 may also be constructed integrally with the coupling connection piece 26. In order to produce the flexibility of the coupling connection piece 26, it may have a portion with a higher degree of resilience than that of the base portion 32. This portion with a higher degree of resilience can thereby replace the ball joint which is formed by the hollow spherical region 34 and the spherical portion 28. The portion may, for example be produced by means of a multi-component injection-molding method in which, for this portion, a softer plastics material is used than for the remaining coupling element 14. In a variation, the coupling element 14 may also be constructed integrally and, in order to produce the flexibility of the coupling connection piece 26, a weakened region, for example, by means of a smaller wall thickness of a portion of the tubular portion 30, may be provided so that the ball joint may be dispensed with. As a result of the flexibility of the coupling connection piece 26, in particular an improved durability, particularly in the event of vibrations, can be achieved. Furthermore, in particular production tolerances in the production of the wiper blade 10 can be better compensated for or the assembly of the wiper blade 10 can be simplified.

In another variation, additionally or alternatively to ribbing 44, an undercut may be provided in the tubular portion 30. Similarly, one of the coupling connection pieces 26 may also be constructed as a two-way or four-way connection piece so that a plurality of channels 38 are guided in a single coupling connection piece 26 and are connected to a plurality of fluid channels 22. Furthermore, the movability of the coupling connection piece 26 may be limited, for example, by means of guides. As a result of a lateral guide, for example, by means of guiding walls, the three-dimensional movability of the coupling connection piece 26 may be reduced to a two-dimensional movability.

What is claimed is:

1. A wiper blade (10) comprising
a wiper bar (12) defining a first portion of a fluid channel (22), the wiper bar (12) being elongated to define a longitudinal axis and
a coupling element (14), which comprises a base portion (32) defining a second portion of the fluid channel (22), and further includes a coupling connection piece (26) defining a third portion of the fluid channel (22) for coupling together the first portion and the second portion of the fluid channel (22),
characterized in that the coupling connection piece (26) is at least partially flexible,
wherein the coupling connection piece (26) includes a first end coupled to the wiper bar (12) and a second end coupled to the base portion (32) such that the first portion of the fluid channel (22) fluidly communicates with the second portion of the fluid channel (22) through the third portion of the fluid channel (22),
wherein the coupling connection piece (26) is constructed as a ball seat connection piece, and
wherein the first portion of the fluid channel (22), the second portion of the fluid channel (22) and the third portion of the fluid channel (22) each are elongated in a direction parallel to the longitudinal axis of the wiper bar (12).

2. The wiper blade (10) according to claim 1, characterized in that the coupling element (14) is configured for securing to a wiper arm.

3. The wiper blade (10) according to claim 1, characterized in that the wiper bar (12) has a wind deflector strip (20), which carries the fluid channel (22).

4. The wiper blade (10) according to claim 1, characterized in that a plurality of coupling connection pieces (26) are provided.

5. The wiper blade (10) according to claim 4, characterized in that at least one of the coupling connection pieces (26) is provided for guiding fluid into the fluid channel (22).

6. The wiper blade (10) according to claim 1, characterized in that the coupling connection piece (26) has a ribbing (44).

7. The wiper blade (10) according to claim 1, characterized in that the ball seat connection piece is guided laterally.

* * * * *